United States Patent
Khatwa

(10) Patent No.: US 7,688,254 B2
(45) Date of Patent: Mar. 30, 2010

(54) DISPLAY OF HIGH-CRUISE-ALTITUDE WEATHER

(75) Inventor: Ratan Khatwa, Sammamish, WA (US)

(73) Assignee: Honeywell International, Inc., Morristown, NJ (US)

( * ) Notice: Subject to any disclaimer, the term of this patent is extended or adjusted under 35 U.S.C. 154(b) by 146 days.

(21) Appl. No.: 12/147,878

(22) Filed: Jun. 27, 2008

(65) Prior Publication Data

US 2009/0322594 A1  Dec. 31, 2009

(51) Int. Cl.
  *G01S 13/08* (2006.01)
(52) U.S. Cl. ............... 342/123; 342/26 B
(58) Field of Classification Search .............. 342/26 B, 342/123
See application file for complete search history.

(56) References Cited

U.S. PATENT DOCUMENTS

| 6,549,161 | B1 | 4/2003 | Woodell | |
|---|---|---|---|---|
| 6,597,305 | B2 | 7/2003 | Szeto et al. | |
| 6,700,482 | B2 | 3/2004 | Ververs et al. | |
| 6,879,280 | B1 | 4/2005 | Bull et al. | |
| 7,109,913 | B1 | 9/2006 | Paramore et al. | |
| 7,411,541 | B2 * | 8/2008 | Khatwa | ............ 342/26 R |
| 7,492,304 | B1 * | 2/2009 | Woodell et al. | ............ 342/26 B |
| 2003/0016156 | A1 * | 1/2003 | Szeto et al. | ............ 342/26 |

* cited by examiner

*Primary Examiner*—Thomas H Tarcza
*Assistant Examiner*—Timothy A Brainard
(74) *Attorney, Agent, or Firm*—Black Lowe & Graham PLLC; P. G. Scott Born

(57) ABSTRACT

A method implementable in a weather-radar system of an aircraft, the weather-radar system configured to generate to a display device, in response to radar return information indicating reflectivity levels below a predetermined reflectivity threshold, an image in a first presentation format. The method includes determining if the altitude of the aircraft is above a predetermined threshold altitude, and, if the altitude of the aircraft is above the threshold altitude, displaying, in response to radar return information indicating reflectivity levels below the predetermined reflectivity threshold, the image in a second presentation format different from the first presentation format.

19 Claims, 6 Drawing Sheets

DISPLAY OF HIGH-CRUISE-ALTITUDE WEATHER

BACKGROUND OF THE INVENTION

At high cruise altitudes, weather radar targets displayed as green (i.e., indicating reflectivity levels below a predetermined reflectivity threshold) at short range and that are near the current Flight Level (FL) should be avoided. Typically, at these altitudes (e.g., above FL 300), the weather targets are less reflective. At high altitudes there is a possibility of the presence of unstable air and hail above a storm cell. It is therefore not advisable to penetrate this less-reflective part of the storm top.

SUMMARY OF THE INVENTION

In an embodiment, a method implementable in a weather-radar system of an aircraft, the weather-radar system configured to generate to a display device, in response to radar return information indicating reflectivity levels below a predetermined reflectivity threshold, an image in a first presentation format. The method includes determining if the altitude of the aircraft is above a predetermined threshold altitude, and, if the altitude of the aircraft is above the threshold altitude, displaying, in response to radar return information indicating reflectivity levels below the predetermined reflectivity threshold, the image in a second presentation format different from the first presentation format.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
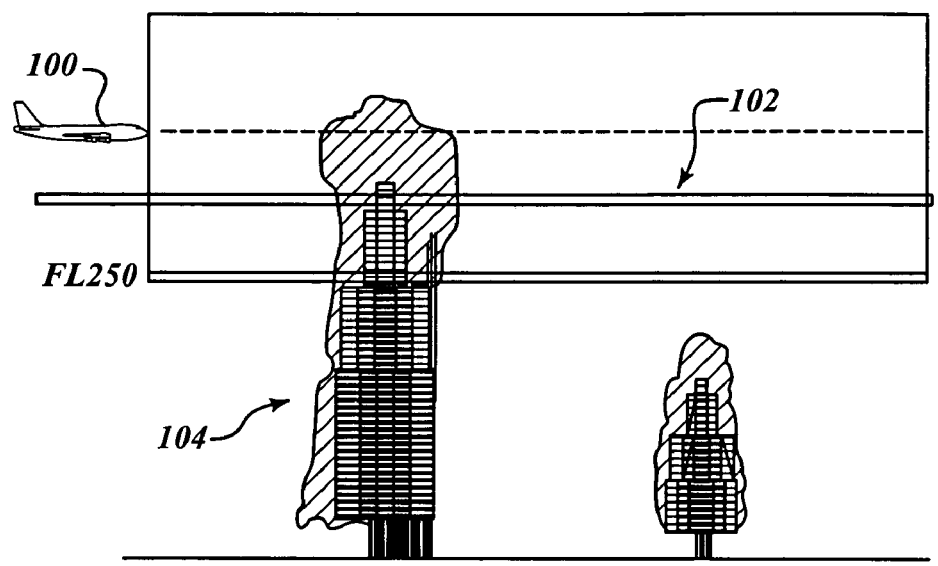
FIG. 1 illustrates a side view of airspace in front of an aircraft according to an embodiment of the present invention.

FIG. 1 illustrates a side view of airspace in front of an aircraft 100. The radar system of the aircraft 100 scans a portion of the airspace, at a manually selected altitude 102, in front of the aircraft 100. In the example illustrated in FIG. 1, and for purposes of the ensuing discussion, the selected altitude 102 is at approximately FL 310, and may thus be considered a high-altitude flight level. The selected altitude 102 intersects a storm cell 104, illustrated in FIG. 1 in vertical-display format and which is detected by the aircraft radar system.

Figure 2:
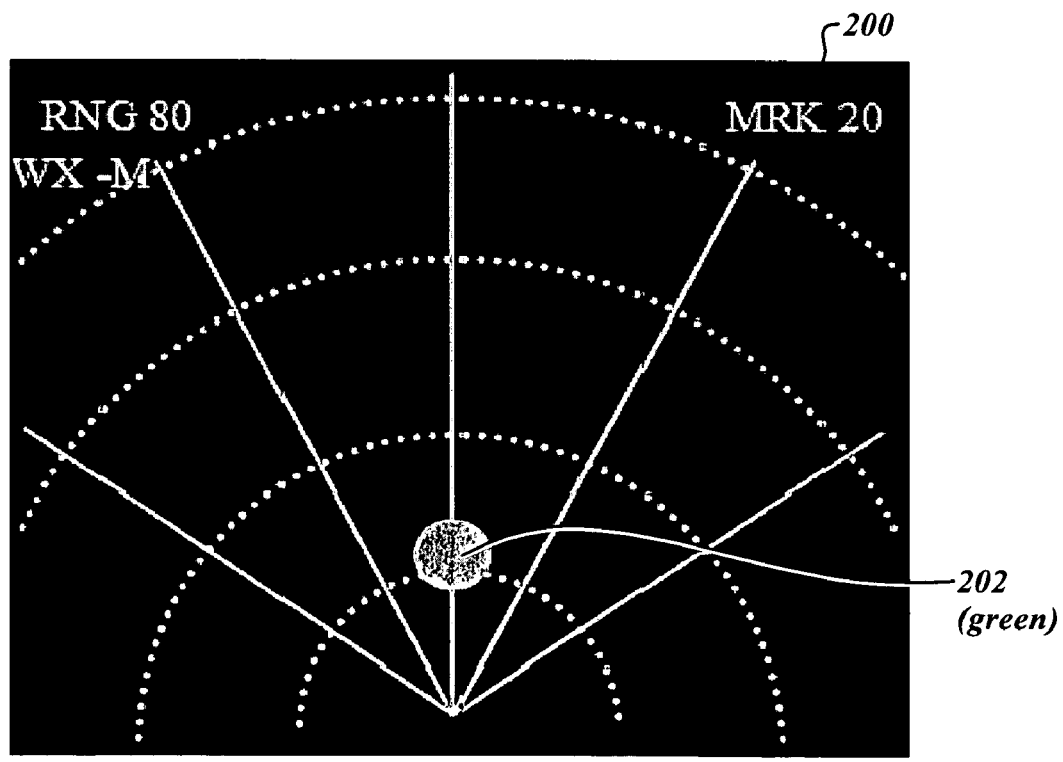
FIG. 2 illustrates a plan view of reflectivity of a storm cell sensed by a radar system of the aircraft of FIG. 1.

FIG. 2 illustrates a plan view of reflectivity of the storm cell 104 sensed by the radar system of the aircraft 100 at the selected altitude 102 and as displayed on a display screen 200 onboard the aircraft. Because reflectivity levels of the storm cell 104 are lower at the high altitude associated with the selected altitude 102, only a green return 202 representing the storm cell 104 is presented on the display screen 200. Consequently, the pilot of the aircraft 100 may erroneously assume that flight through the storm cell 104 at the selected altitude 102 is safe.

Figure 3:
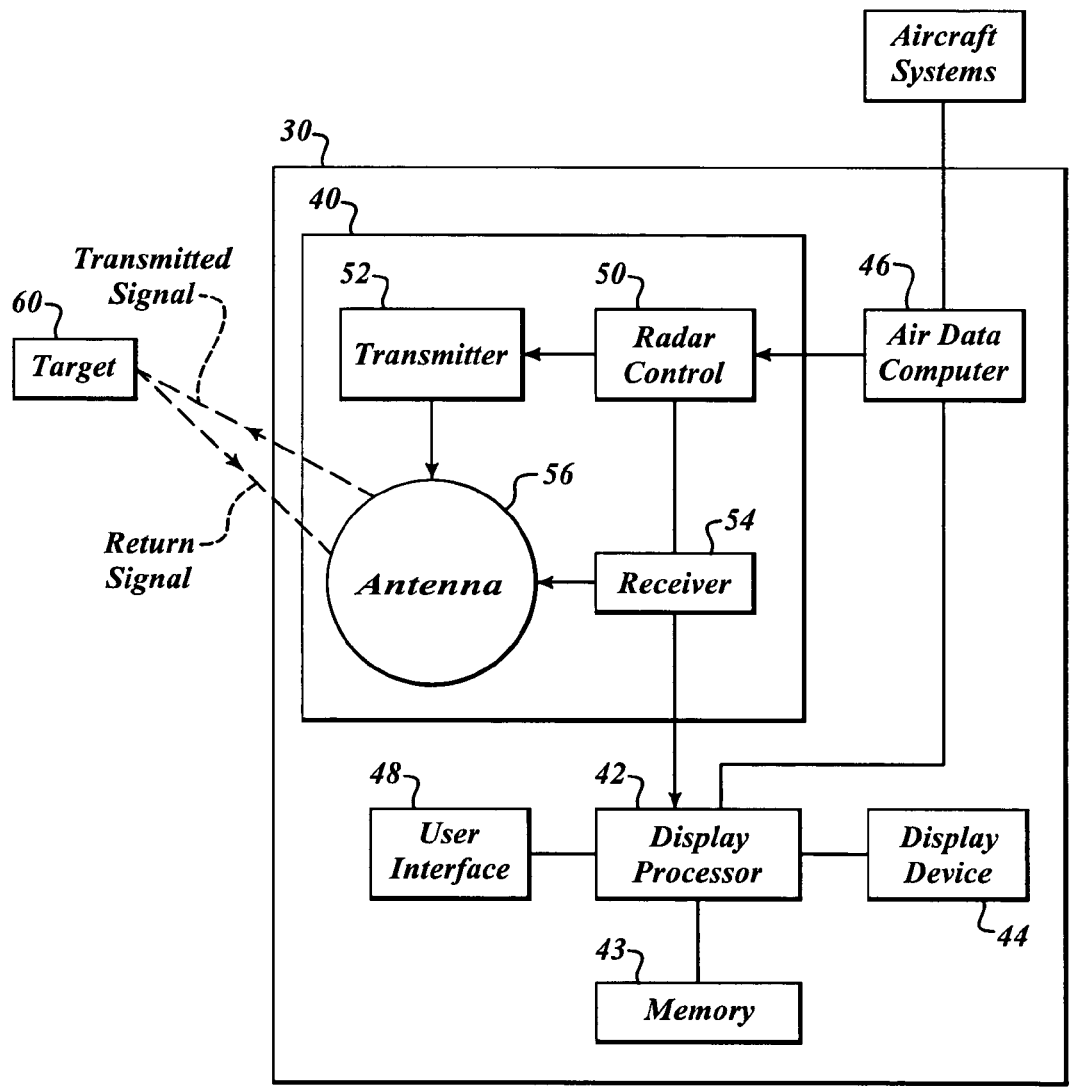
FIG. 3 illustrates an exemplary system formed in accordance with an embodiment of the present invention.

FIG. 3 illustrates an example of a suitable operating environment in which the invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The operating environment illustrated in FIG. 3 typically includes at least some form of computer readable media. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Embodiments of the invention include a system, method, and computer program product for alerting a pilot of hazardous weather conditions at high altitude. FIG. 3 illustrates an exemplary system 30 formed in accordance with an embodiment of the present invention. The system 30 includes a weather radar system 40, a display processor 42, memory 43, a display device 44, an air data computer 46, and user interface 48 coupled to the display processor 42. The display processor 42 is electrically coupled to the radar system 40, the display device 44, the air data computer 46, and the memory 43.

An embodiment of the radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the air data computer 46, a Flight Management System (FMS), Inertial Navigation System (INS), and/or Global Positioning System (GPS).

The air data computer 46 generates air data based on signals received from various aircraft flight systems. The radar system 40 transmits radar signals from the antenna 56 into space and receives return signals (reflectivity values) if a target 60, such as a storm cell, is contacted by the transmitted radar signal. Preferably, the radar system 40 digitizes the return signals and sends the digitized signals to the display processor 42. The display processor 42 translates the received return signals for storage in a three-dimensional buffer in the memory 43. The display processor 42 then generates a two-dimensional image for presentation on the display device 44 based on any control signals sent from the user interface 48 or based on settings within the processor 42. In alternative embodiments, the image may be in three dimensions, in a plan-view-image format, or presented on a vertical situation display (VSD).

The translated return signals (return data), as determined by the radar system 40 or processor 42, identify certain weather targets, such as rain/moisture, windshear, or turbulence. The type of weather target identified is based on a corresponding present algorithmic interpretation of the reflectivity values. The pilot can select the type of weather identified using the user interface 48, or such weather type may be automatically displayed. The pilot may also be able to control range, gain, and display mode (e.g., AUTO weather, MANUAL weather, MAP mode).

Figure 4:
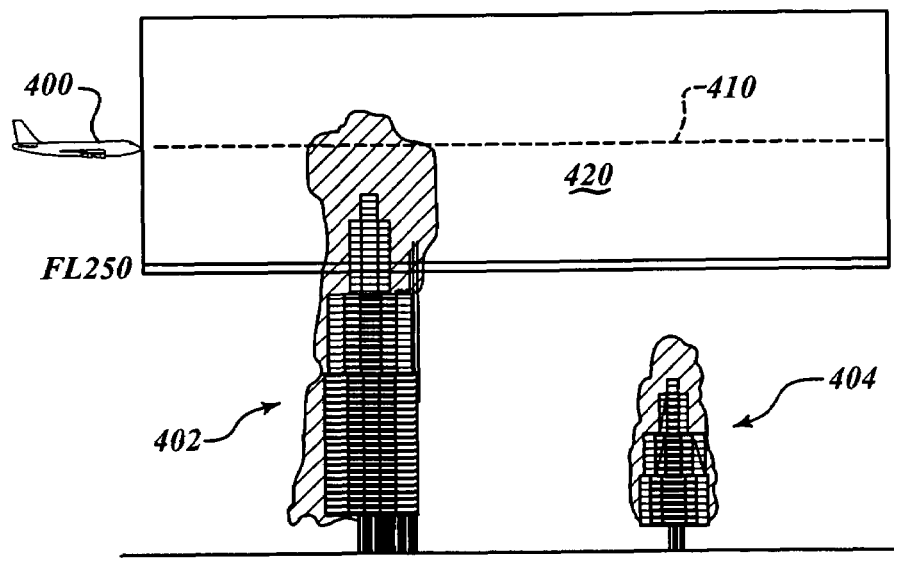
FIG. 4 illustrates a side view of airspace in front of an aircraft according to an embodiment of the present invention.
Figure 5:
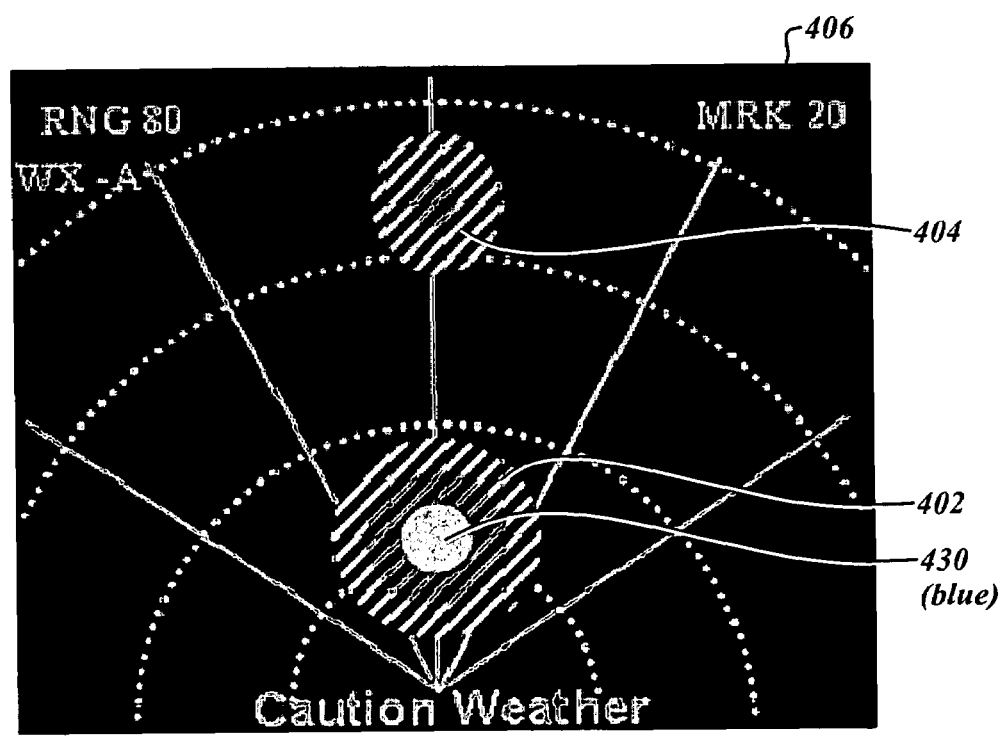
FIGS. 5-6 illustrate alternative-embodiment plan views of reflectivity of storm cells sensed by the radar system of the aircraft of FIG. 4.
Figure 6:
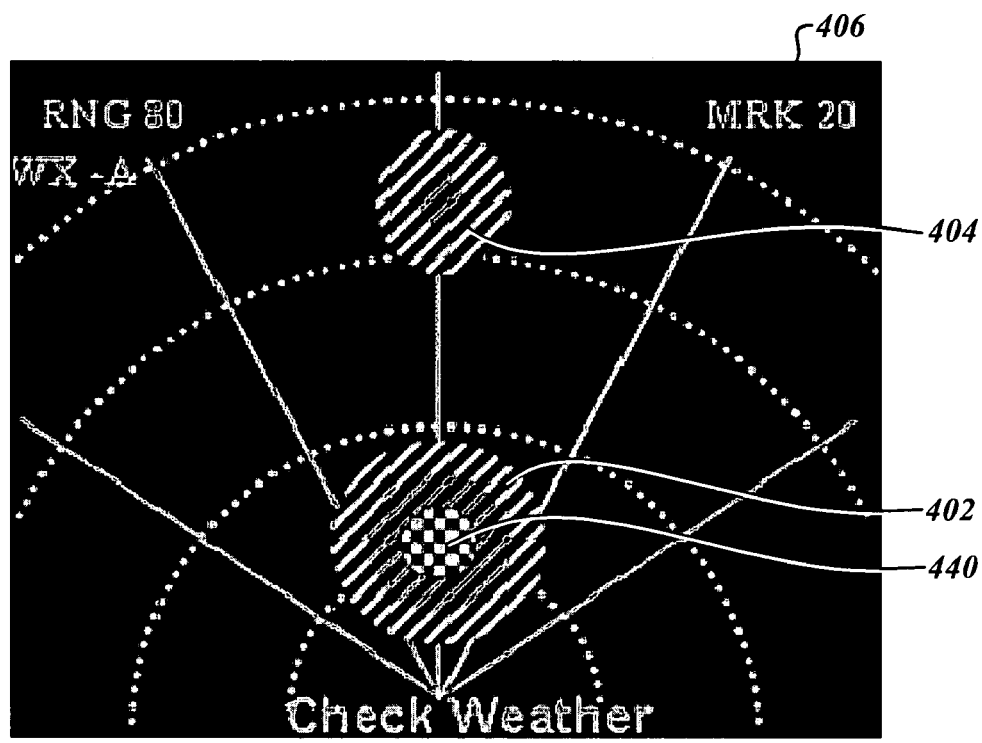

Referring to FIGS. 4-6, an embodiment of the invention includes what may be termed an "AUTO" mode, which is intended for the strategic detection of weather. FIG. 4 illustrates a side view of airspace in front of an aircraft 400. Although FIG. 4 illustrates a two-dimensional side view, the radar return information is translated into three-dimensional storage locations (voxels) of the three-dimensional buffer. FIGS. 5-6 illustrate alternative-embodiment plan views of reflectivity of storm cells 402, 404 sensed by the radar system of the aircraft 400 and as displayed on a display screen 406 onboard the aircraft. For purposes of the illustrated examples, one may assume that the aircraft 400 is at high-altitude cruise flight (FL>310) with green reflectivity levels within 4000 ft of the current FL and within 20 nautical mile (nm) range.

Specifically, the system 30 may be onboard an aircraft 400 and can be configured to make an automatic distinction between weather associated with the intended vertical flight path 410 and weather that is not. In AUTO mode, "Flight Path Weather", or weather near the altitude of the intended flight path 410, is displayed in contrast with "Secondary Weather," which is further removed in altitude from the flight path. The separation is accomplished by applying an envelope 420 (e.g., ±4000 feet) around the intended flight path 410: weather within the envelope 420 is considered Flight Path Weather, such as that associated with the topmost portion of storm cell 402; weather outside the envelope 420 is considered Secondary Weather, such as that associated with storm cell 404. As shown in FIGS. 5-6, Secondary Weather may be visually distinguished from Flight Path Weather, which may be represented by a solid-color texture, by a distinguishing texture, such as black stripes. To aid the flight crew, at certain altitudes and flight path angles, the envelope 420 may be expanded. At altitudes above 29,000 feet MSL, the floor of the envelope 420 may be fixed at 25,000 feet MSL. This ensures display of convective activity associated with less reflective frozen storm tops.

Figure 11:
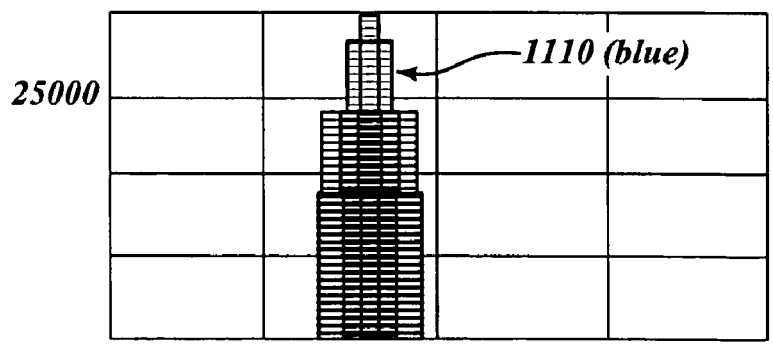
FIG. 11 illustrates a vertical-display view of reflectivity of a storm cells sensed by the radar system of the aircraft of FIG. 4 or 7 according to an embodiment of the present invention.

As discussed above with reference to FIGS. 1 and 2, green returns close to the current FL at high altitude and close range may actually be indicative of hazardous weather. As such, an embodiment of the invention includes visually coding the presentation of reflectivity levels, ordinarily displayed in green, at high altitudes (e.g., above FL 310) when reflected storm-cell elements are within a predetermined vertical distance from the aircraft's current altitude/FL (e.g., 2500 ft) and range (e.g., 20 nm). Colors other than green (e.g., amber, cyan, etc.), as illustrated by reference numeral 430 in FIG. 5, and/or textures other than solid (e.g., checker board pattern), as illustrated by reference numeral 440 in FIG. 6, can be utilized. Such an alternative-color or -texture scheme may also be implemented in a VSD display, as illustrated in FIG. 11, wherein the high-altitude storm-cell top 1110 is displayed in blue rather than green. In addition, a visual alert, such as the textual alerts "Caution Weather" shown in FIG. 5 or "Check Weather" shown in FIG. 6, could be provided on the weather radar display and/or on an Electronic Indication and Crew Alerting System (EICAS) display. The visual alert could be accompanied by a corresponding auditory alert (e.g., "Avoid weather", "Check weather") played over speakers or pilot headset (not shown) inside the cockpit of the aircraft 400.

Figure 7:
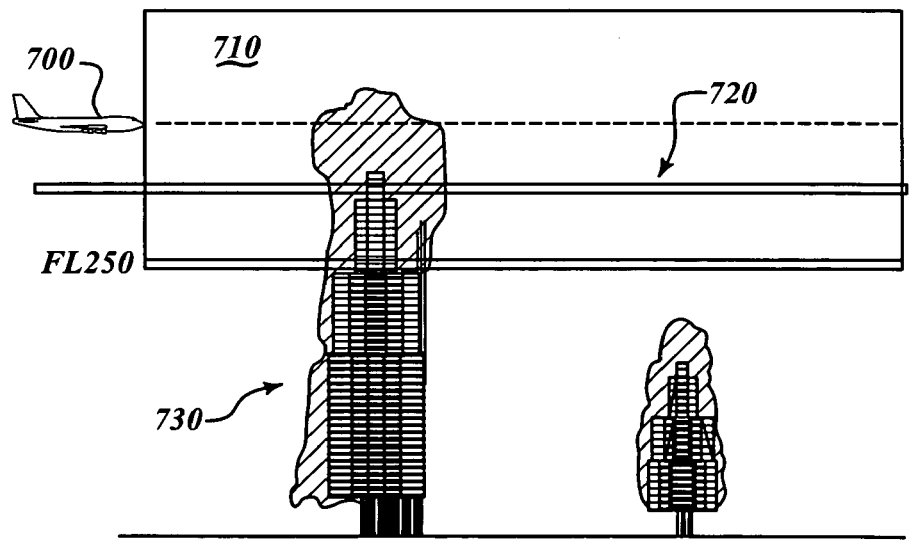
FIG. 7 illustrates a side view of airspace in front of an aircraft according to an alternative embodiment of the present invention.
Figure 8:
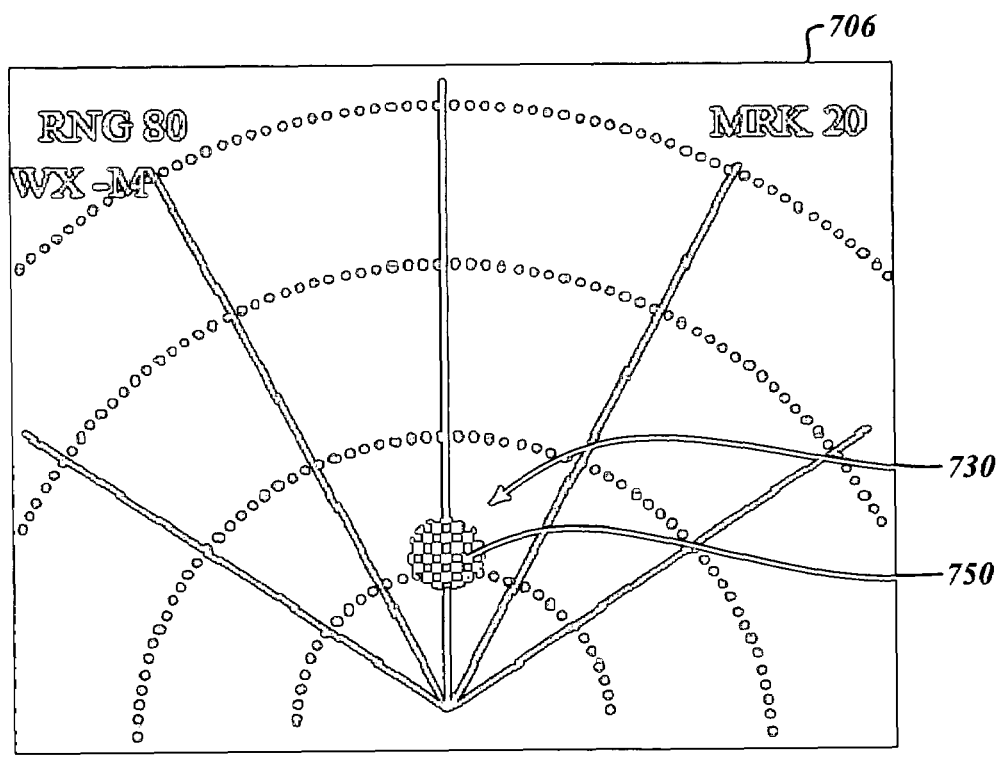
FIGS. 8-9 illustrate alternative-embodiment plan views of reflectivity of a storm cell sensed by the radar system of the aircraft of FIG. 7.
Figure 9:
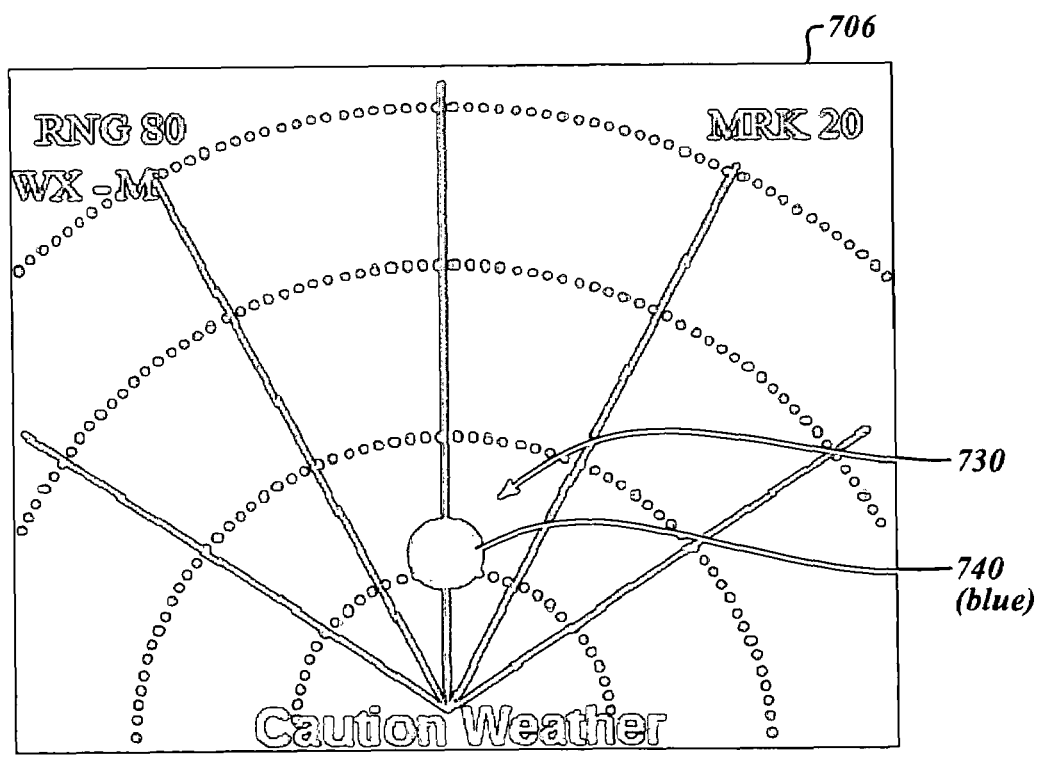

Referring to FIGS. 7-9, an embodiment of the invention includes what may be termed a "MANUAL" mode, which may be used as a tactical weather-analysis tool (e.g., determining vertical extent of weather returns). FIG. 7 illustrates a side view of airspace in front of an aircraft 700. The radar system 40 of the aircraft 700 scans a portion 710 of the airspace above, for example, FL 250, at a manually selected altitude 720, in front of the aircraft 700. The selected altitude 720 intersects a storm cell 730, which is detected by the aircraft radar system 40. Although FIG. 7 illustrates a two-dimensional side view, the radar return information is translated into three-dimensional storage locations (voxels) of the three-dimensional buffer. As previously alluded to, a plan view display of reflectivity at a specific (constant) altitude can be manually selected. As such, FIGS. 8-9 illustrate alternative-embodiment plan views of reflectivity of the storm cell 730 at the selected altitude 720 sensed by the radar system 40 of the aircraft 700 and as displayed on a display screen 706 onboard the aircraft. For purposes of the illustrated examples, one may assume that the aircraft 700 is at high-altitude cruise flight (FL>310) with green reflectivity levels within 4000 ft of the current FL and within 20 nautical mile (nm) range.

Since the volumetric buffer associated with system 30 can correct for Earth's curvature, the views associated with FIGS. 8-9 may be at constant Mean Sea Level (MSL) altitude. Similar to the AUTO Mode functionality discussed above with reference to FIGS. 4-6, an embodiment of the invention includes visually coding the presentation of reflectivity levels, ordinarily displayed in green, at high altitudes (e.g., above FL 310) when reflected storm-cell elements are within a predetermined vertical distance from the aircraft's current altitude/FL (e.g., 4000 ft) and range (e.g., 20 nm). Colors other than green (e.g., amber, cyan, etc.), as illustrated by reference numeral 740 in FIG. 9, and/or textures other than solid (e.g., checker board pattern), as illustrated by reference numeral 750 in FIG. 8, can be utilized. Such an alternative-color or -texture scheme may also be implemented in a VSD display, as illustrated in FIG. 11, wherein the high-altitude storm-cell top 1110 is displayed in blue rather than green. In addition, a visual alert, such as the textual alert "Caution Weather" shown in FIG. 9, could be provided on the weather radar display and/or on an Electronic Indication and Crew Alerting System (EICAS) display. The visual alert could be accompanied by a corresponding auditory alert (e.g., "Avoid weather", "Check weather") played over speakers or pilot headset (not shown) inside the cockpit of the aircraft 700.

Figure 10:
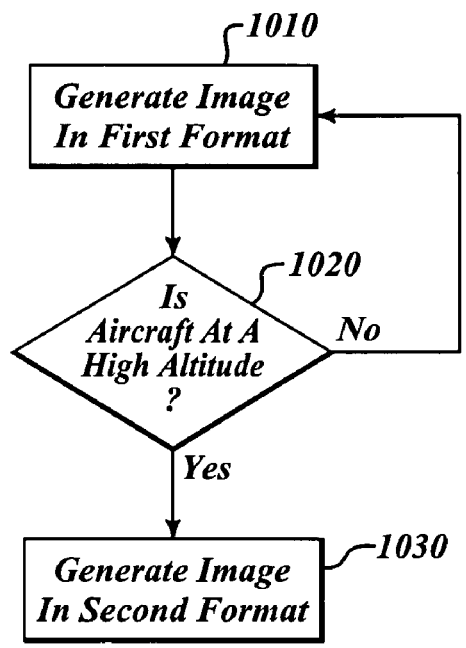
FIG. 10 illustrates a process according to an embodiment of the invention.

FIG. 10 illustrates a process 1000 according to an embodiment of the invention. The process 1000 is implementable in an electronic system coupled to or including a storage device, such as, for example, system 30. The process 1000 is illustrated as a set of operations shown as discrete blocks. The process 1000 may be implemented in any suitable hardware, software, firmware, or combination thereof. The order in which the operations are described is not to be necessarily construed as a limitation.

At a block 1010, in response to radar return information indicating reflectivity levels below a predetermined reflectivity threshold, an image is generated to a display in a first presentation format. For example, the radar system 40 of the aircraft 400 scans a portion of the airspace in front of the aircraft and may detect a storm cell 402. If a low-level (e.g., "green-level") of reflectivity is associated with the storm cell 402, a green return, such as green return 202 illustrated in FIG. 2, is presented on the display screen 406.

At a block 1020, the altitude of the aircraft is determined as being at/above or below a predetermined threshold altitude. For example, if the system 30 determines that the aircraft 400 is below high-altitude cruise flight (e.g., FL<310), then the reflectivity return generated to the display screen 406 continues to be a green return 202. The system 30 may make subsequent periodic altitude determinations to determine whether the altitude of the aircraft 400 has changed. Otherwise, as discussed below, the process 1000 continues to block 1030.

At a block 1030, if the altitude of the aircraft is above the threshold altitude, the image is displayed in a second presentation format different from the first presentation format in response to radar return information indicating reflectivity levels below the predetermined reflectivity threshold. For example, if the system 30 determines that the aircraft 400 is at or above high-altitude cruise flight (e.g., FL>310), then the reflectivity return generated to the display screen 406 may be presented using colors other than green (e.g., amber, cyan, etc.), as illustrated by reference numeral 430 in FIG. 5, and/or textures other than solid (e.g., checker board pattern), as illustrated by reference numeral 440 in FIG. 6.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method implemented in a weather-radar system of an aircraft, the method comprising:
    generating to a display device, in response to radar return information indicating reflectivity levels below a predetermined reflectivity threshold, an image in a first presentation format,
    determining if the altitude of the aircraft is above a predetermined threshold altitude; and
    if the altitude of the aircraft is above the threshold altitude, displaying, in response to radar return information indicating reflectivity levels below the predetermined reflectivity threshold, the image in a second presentation format different from the first presentation format.

2. The method of claim 1, further comprising:
    determining if the radar return information is reflected from within a threshold distance from the aircraft's present position; and
    wherein displaying the image comprises displaying the image in a second presentation format if the radar return information is reflected from within the threshold distance.

3. The method of claim 2, wherein determining if the radar return information is reflected from within a threshold distance from the aircraft's present position further comprises determining if the return information is reflected from a position at the same altitude as the aircraft and that the position is along at least one of the aircraft's current heading, track and flight plan.

4. The method of claim 1 stored in a three-dimensional buffer.

5. The method of claim 1, further comprising generating, if the altitude of the aircraft is above the threshold altitude and in response to radar return information indicating reflectivity levels below the predetermined reflectivity threshold, an audible alarm.

6. The method of claim 1, further comprising generating, if the altitude of the aircraft is above the threshold altitude and in response to radar return information indicating reflectivity levels below the predetermined reflectivity threshold, a textual image and displaying the generated textual image.

7. The method of claim 1, wherein the first presentation format comprises a first color and the second presentation format comprises a second color.

8. The method of claim 1, wherein the first presentation format comprises a first texture and the second presentation format comprises a second texture.

9. The method of claim 1, wherein the image is generated in the second presentation format only if the radar return information is associated with a reflection within a predetermined altitude range.

10. An aircraft weather-radar system comprising:
    a display; and
    a processor coupled to the display, the processor configured to:
        generate to the display, in response to radar return information indicating reflectivity levels below a predetermined reflectivity threshold, an image in a first presentation format,
        determine if the altitude of the aircraft is above a predetermined threshold altitude, and
        if the altitude of the aircraft is above the threshold altitude, displaying, in response to radar return information indicating reflectivity levels below the predetermined reflectivity threshold, the image in a second presentation format different from the first presentation format.

11. The system of claim 10 wherein the processor is further configured to determine if the radar return information is reflected from within a threshold distance from the aircraft's present position; and wherein displaying the image comprises displaying the image in a second presentation format if the radar return information is reflected from within the threshold distance.

12. The system of claim 10, further comprising a memory configured to store radar return information in a three-dimensional buffer.

13. The system of claim 10, wherein the processor is further configured to generate, if the altitude of the aircraft is above the threshold altitude and in response to radar return information indicating reflectivity levels below the predetermined reflectivity threshold, an audible alarm.

14. The system of claim 10, wherein the processor is further configured to generate, if the altitude of the aircraft is above the threshold altitude and in response to radar return information indicating reflectivity levels below the predetermined reflectivity threshold, a textual image and displaying the generated textual image.

15. A computer-readable medium including instructions that, when executed by a processor onboard an aircraft, enable the processor to perform steps comprising:

generating to a display, in response to radar return information indicating reflectivity levels below a predetermined reflectivity threshold, an image in a first presentation format;

determining if the altitude of the aircraft is above a predetermined threshold altitude; and if the altitude of the aircraft is above the threshold altitude, displaying, in response to radar return information indicating reflectivity levels below the predetermined reflectivity threshold, the image in a second presentation format different from the first presentation format.

16. The medium of claim 15 wherein the steps further comprise storing radar return information in a three-dimensional buffer.

17. The medium of claim 15, wherein the steps further comprise determining if the radar return information is reflected from within a threshold distance from the aircraft's present position; and wherein displaying the image comprises displaying the image in a second presentation format if the radar return information is reflected from within the threshold distance.

18. The medium of claim 15, wherein the first presentation format comprises a first color and the second presentation format comprises a second color.

19. The medium of claim 15, wherein the first presentation format comprises a first texture and the second presentation format comprises a second texture.

* * * * *